• United States Patent  
Sato

(10) Patent No.: US 8,038,531 B2  
(45) Date of Patent: Oct. 18, 2011

(54) RECORDING MEDIUM RECORDING GAME PROGRAM, AND GAME SYSTEM

(75) Inventor: Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 895 days.

(21) Appl. No.: 11/519,034

(22) Filed: Sep. 12, 2006

(65) Prior Publication Data

US 2007/0207856 A1 Sep. 6, 2007

(30) Foreign Application Priority Data

Mar. 6, 2006 (JP) ................. 2006-059952

(51) Int. Cl.
*A63F 13/00* (2006.01)

(52) U.S. Cl. .......... 463/32; 463/5; 463/7; 463/9; 463/33

(58) Field of Classification Search ............. 463/32, 463/33, 5, 7, 9, 43
See application file for complete search history.

(56) References Cited

U.S. PATENT DOCUMENTS

| | | | | |
|---|---|---|---|---|
| 6,347,999 B1 * | 2/2002 | Yuan | | 463/46 |
| 6,508,708 B1 * | 1/2003 | Okubo | | 463/32 |
| 2001/0003708 A1 * | 6/2001 | Aizu et al. | | 463/7 |
| 2003/0032478 A1 * | 2/2003 | Takahama et al. | | 463/30 |
| 2004/0219978 A1 * | 11/2004 | Teramoto et al. | | 463/32 |
| 2005/0009602 A1 * | 1/2005 | Nishimura | | 463/30 |
| 2005/0202868 A1 * | 9/2005 | Sawano et al. | | 463/30 |
| 2007/0010328 A1 * | 1/2007 | Yokota et al. | | 463/42 |

FOREIGN PATENT DOCUMENTS

JP 11-53572 2/1999
JP 2001-224849 8/2001

* cited by examiner

*Primary Examiner* — Dmitry Suhol
*Assistant Examiner* — Brandon Gray
(74) *Attorney, Agent, or Firm* — Nixon & Vanderhye P.C.

(57) ABSTRACT

A designated position of a topographic object provided in a virtual game space is detected from a position on a screen designated by an operation device. A shape of topography at the detected designated position of the topographic object and in a vicinity thereof, into a shape whose height is gradually changed, depending on a distance from the designated position. When the movable object contacts the topographic object, a physical calculation is performed with respect to a contact surface based on the changed shape, and based on a result of the calculation, movement of the movable object is controlled.

12 Claims, 16 Drawing Sheets

F I G. 4
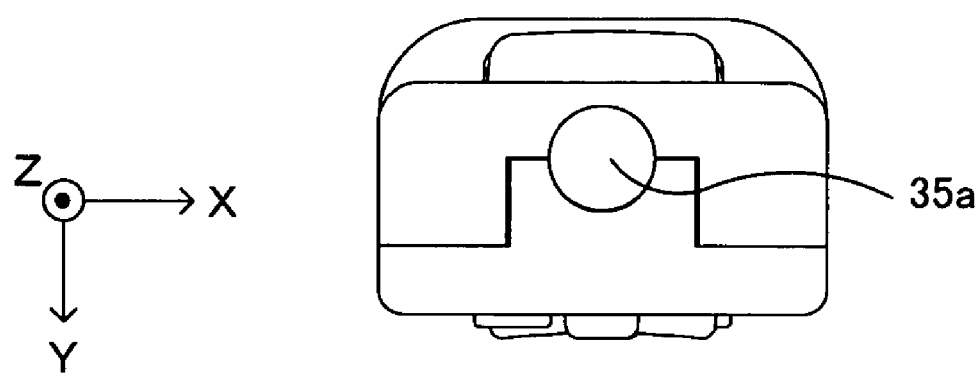

F I G. 6
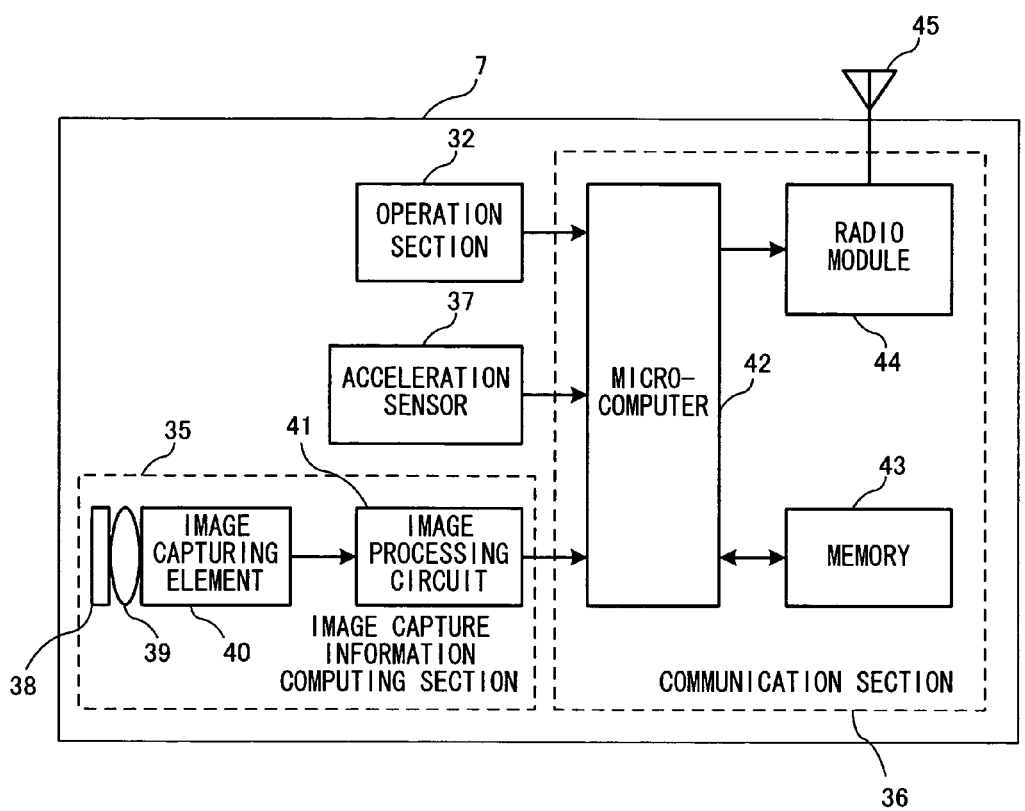

TOPOGRAPHY OPERATION POSITION

102

102

F I G. 1 8
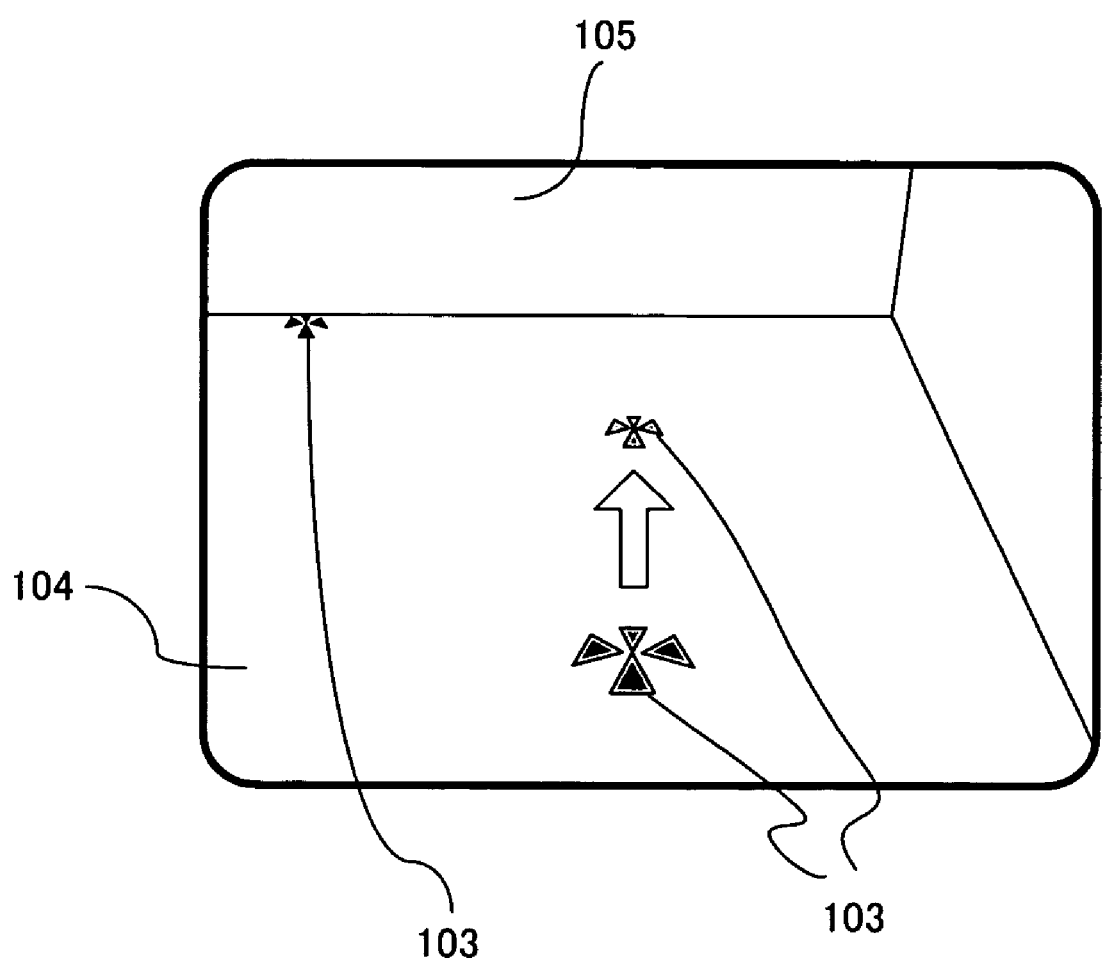

RECORDING MEDIUM RECORDING GAME PROGRAM, AND GAME SYSTEM

CROSS REFERENCE TO RELATED APPLICATION

The disclosure of Japanese Patent Application No. 2006-059952 is incorporated herein by reference.

TECHNICAL FIELD

The exemplary embodiments disclosed herein relate to a recording medium recording a game program, a game system, and a game apparatus. More particularly, the present invention relates to a game program and a game apparatus for a game in which a player character moves a movable object by designating a topographic object.

BACKGROUND AND SUMMARY

Conventionally, there is a technique of changing a background, such as topography or the like, in a game space so as to enhance the sense of realism of a game. For example, when a player character which is a giant robot hits a building, it is displayed that the building collapses, or when the giant robot lands from a high position to a road, it is displayed that the road at its feet becomes dented, thereby enhancing the sense of realism or the reality of a game (e.g., Japanese Patent Laid-Open Publication No. 2001-224849). There is also a technique of displaying an image of topography having a shape which varies in units of several frames, so as to represent vertically undulating topography, in a horizontal scroll shooting game (e.g., Japanese Patent Laid-Open Publication No. 11-53572).

However, regarding a change in a background disclosed in the above-described patent documents, a background object, such as topography or the like, is changed by a player operating a player character. In other words, it is not that the player directly designates a background object, such as topography or the like, and changes a shape thereof.

Therefore, a feature of certain exemplary embodiments is to provide a recording medium recording a game program in which a player is caused to directly designate a topographic object, and change a shape thereof at the designated position so that the object is moved, and a game system and a game apparatus.

The certain exemplary embodiments described herein have the following features. Note that reference numerals, additional descriptions and the like inside parentheses in this section indicate correspondence to embodiments described below for the sake of easy understanding, and do not restrict the certain exemplary embodiments described herein.

A first exemplary embodiment relates to a recording medium recording a game program which is executed by a computer in a game apparatus to which a display device and an operation device are connected, wherein a game image in which a topographic object and a movable object are provided in a virtual game space is displayed on a screen of the display device. The game program comprises a designated position detecting step (S32), a shape changing step (S37, S39), and a movable object controlling step (S4, S6, S8). The designated position detecting step detects a designated position of the topographic object designated by the operation device. The shape changing step changes a shape of topography at the detected designated position of the topographic object and in a vicinity thereof, into a shape whose height is gradually changed, depending on a distance from the designated position. The movable object controlling step, when the movable object contacts the topographic object, performs a physical calculation with respect to a contact surface based on the shape changed by the shape changing step, and based on a result of the calculation, controls movement of the movable object.

In a second exemplary embodiment based on the first exemplary embodiment, the shape changing step includes determining a height of the designated position to be a predetermined height, and changing a surrounding shape into a shape whose vertical difference from a surface of the topographic object before deformation gradually decreases with an increase in a distance from the designated position.

In a third exemplary embodiment based on the first exemplary embodiment, the game program further comprises an operation data obtaining step (S30) of obtaining first operation data or second operation data from the operation device. The shape changing step changes the heights of the topographic object at the designated position and in the vicinity thereof toward a first direction when the first operation data is obtained in the operation data obtaining step, and changes the heights of the topographic object at the designated position and in the vicinity thereof toward a second direction different from the first direction when the second operation data is obtained in the operation data obtaining step.

In a fourth exemplary embodiment based on the first exemplary embodiment, the game program further comprises a restoring step of restoring the shape of the topographic object deformed by the shape changing step into a shape before the deformation.

In a fifth exemplary embodiment based on the first exemplary embodiment, the topographic object is composed of a plurality of polygons. The shape changing step includes a distance calculating step (S37, S39), a change amount calculating step (S37, S39), and a changing step (S37, S39). The distance calculating step calculates a distance between the designated position of the topographic object and vertices of the plurality of polygons. The change amount calculating step calculates a change amount of a height of each of the vertices of the plurality of polygons. The changing step changes a position of each of the vertices of the plurality of polygons based on the change amount.

In a sixth exemplary embodiment based on the first exemplary embodiment, the game program further comprises a restoring step (S1) of restoring the shape of the topographic object deformed by the shape changing step into a shape before the deformation. The restoring step calculates a change amount of a height of each of the vertices of the plurality of polygons so that the height approaches heights of vertices around the vertex.

In a seventh exemplary embodiment based on the fifth exemplary embodiment, the movable object controlling step includes a movement amount calculating step (S4, S8) of calculating a movement amount of the movable object by performing a physical calculation based on the change amount calculated by the change amount calculating step, and a moving step (S4, S8) of moving the movable object based on the movement amount.

In an eighth exemplary embodiment based on the fifth exemplary embodiment, the game program further comprises a normal vector calculating step (S8) and a gravity vector calculating step (S4). The normal vector calculating step calculates normal vectors of the plurality of polygons changed by the changing step. The gravity vector calculating step calculates a gravity vector pointing immediately downward in the virtual game space. The movable object controlling step includes a movement direction setting step of performing a physical calculation based on the normal vector and the gravity vector, thereby setting a movement direction of the movable object.

In a ninth exemplary embodiment based on the seventh or eighth exemplary embodiments, specific process information is set for a portion of the plurality of polygons. The game program further comprises a determining step and a movement information correcting step. The determining step determines whether or not the specific process information is set for a polygon which the movable object contacts. The movement information correcting step, when it is determined in the determining step that the specific process information is set, corrects at least one of the movement amount calculated by the movement amount calculating step and the movement direction calculated by the movement direction setting step. The moving step moves the movable object based on the at least one of the movement amount and the movement direction corrected by the movement information correcting step.

In a tenth exemplary embodiment based on the first exemplary embodiment, the game executed by the game program is a ball game in which the movable object is a ball, and the ball is moved toward a target enclosed by a target frame, and a point is gained by putting the ball into the target frame. An operation of moving the ball toward the target frame is an operation of causing an object to be operated to perform shooting.

An eleventh exemplary embodiment is directed to a game system comprising a display device (2), an operation device (7), a designated position detecting section (10), a shape changing section (10), and a movable object controlling section (10). The display device displays a game image in which a topographic object and a movable object are provided in a virtual game space. The designated position detecting section detects a designated position of the topographic object designated by the operation device. The shape changing section changes a shape of topography at the detected designated position of the topographic object and in a vicinity thereof, into a shape whose height is gradually changed, depending on a distance from the designated position. The movable object controlling section, when the movable object contacts the topographic object, performs a physical calculation with respect to a contact surface based on the shape changed by the shape changing step, and based on a result of the calculation, controls movement of the movable object.

A twelfth exemplary embodiment is directed to a game apparatus to which a display device (2) and an operation device (7) are connected, wherein a game image in which a topographic object and a movable object are provided in a virtual game space is displayed on a screen of the display device. The game apparatus comprises a designated position detecting section (10), a shape changing section (10), and a movable object controlling section (10). The designated position detecting section detects a designated position of the topographic object designated by the operation device. The shape changing section changes a shape of topography at the detected designated position of the topographic object and in a vicinity thereof, into a shape whose height is gradually changed, depending on a distance from the designated position. The movable object controlling section, when the movable object contacts the topographic object, performs a physical calculation with respect to a contact surface based on the shape changed by the shape changing step, and based on a result of the calculation, controls movement of the movable object.

According to the first exemplary embodiment, a movable object can be indirectly operated by deforming a topographic object according to a user's intention. Therefore, it is possible to provide a game having a novel sense of operation.

According to the second exemplary embodiment, a convex or concave can be formed around a designated position as a center on topography. Thereby, it is possible to provide a game having a novel sense of operation, i.e., movement of a movable object using the convex and concave.

According to the third exemplary embodiment, a player can select a deformation direction of topography. Thereby, the variety of strategies of a game can be increased, resulting in a more interesting game.

According to the fourth exemplary embodiment, it is possible to restore deformed topography. Thereby, it can be expressed that the deformed topography is gradually made flat.

According to the fifth exemplary embodiment, deformation of topography composed of polygons is processed by computation with respect to vertices of the polygon. Therefore, a change in the shape of topography can be expressed in a more realistic manner.

According to the sixth exemplary embodiment, it is possible to perform computation based on the heights of vertices of surrounding polygons. Therefore, it can be expressed that topography is gradually made fat.

According to the seventh exemplary embodiment, a physical calculation is performed based on a change amount of a polygon of a topographic object. Therefore, it can be more naturally expressed that a movable object is moved, by the shape of topography being changed.

According to the eighth exemplary embodiment, a movement direction of a movable object is determined based on a normal vector and a gravity vector of a polygon of deformed topography. Therefore, it can be more naturally expressed that a movable object is moved in various directions, depending on a change in topography.

According to the ninth exemplary embodiment, when a movable object is located at a predetermined position, it is possible to cause the movable object to perform a specific movement.

According to the tenth exemplary embodiment, a ball game can be made more exciting.

According to the eleventh and twelfth exemplary embodiments, an effect similar to that of the first exemplary embodiment can be obtained.

These and other objects, features, aspects and advantages of certain exemplary embodiments will become more apparent from the following detailed description of these certain exemplary embodiments when taken in conjunction with the accompanying drawings.

BRIEF DESCRIPTION OF THE DRAWINGS

FIG. 4 is a front view of the controller 7;

FIG. 6 is a block diagram illustrating a configuration of the controller 7;

FIG. 18 is a diagram illustrating a state in which a cursor is moved on a ground.

DETAILED DESCRIPTION

Figure 1:
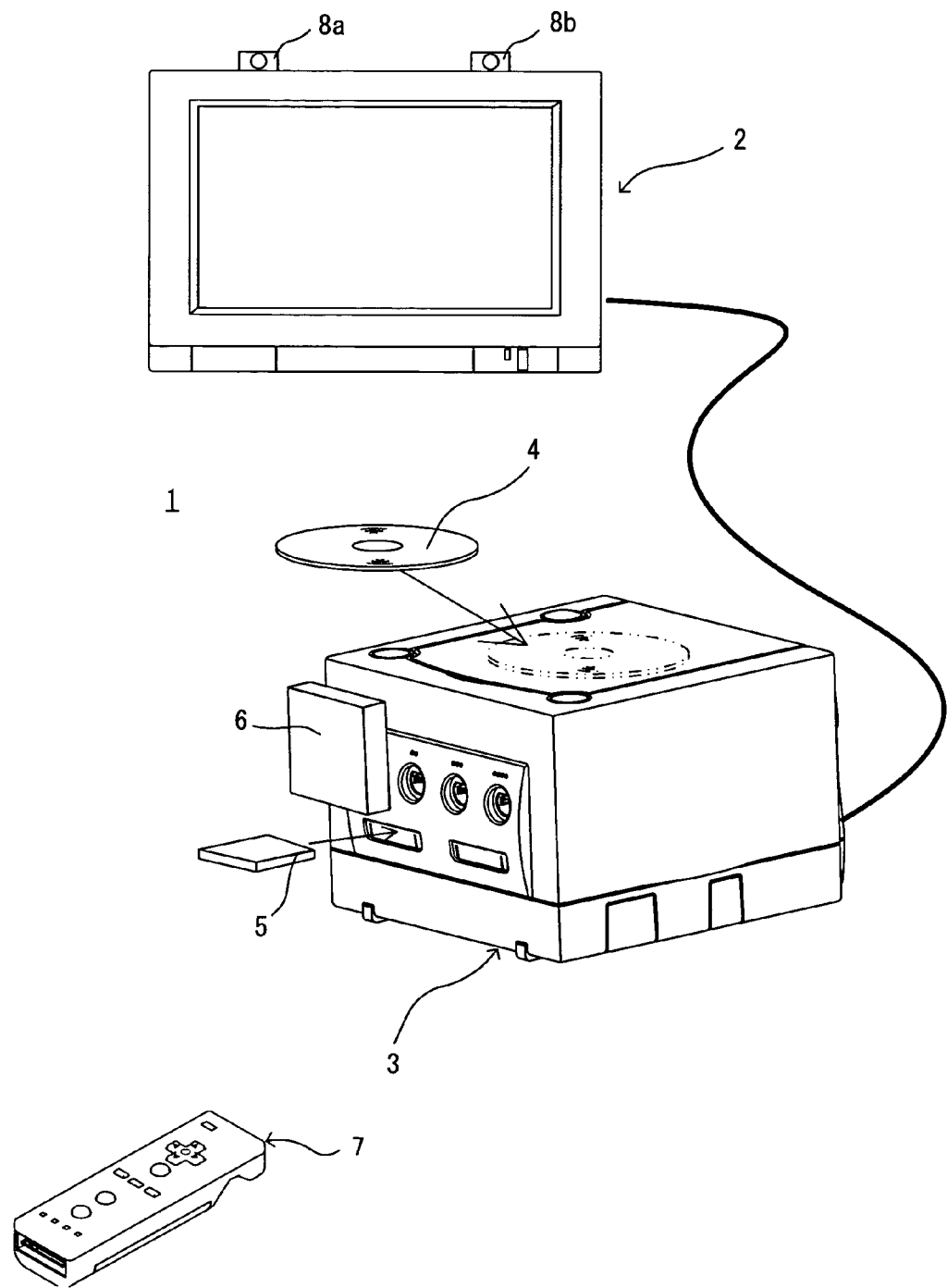
FIG. 1 is an outer appearance diagram illustrating a game system including a game apparatus which is an exemplary coordinate calculating apparatus according to an exemplary embodiment of the present invention.

Referring to FIG. 1, a game system 1 including a game apparatus according to an exemplary embodiment will be described. FIG. 1 is an outer appearance diagram for explaining the game system 1. Hereinafter, the game apparatus of certain exemplary embodiments will be described using a stationary game apparatus as an example.

In FIG. 1, the game system 1 is composed of a stationary game apparatus (hereinafter simply referred to as a game apparatus) 3 which is connected via a connection code to a display (hereinafter referred to as a monitor) 2 with a loudspeaker, such as a television set for home use or the like, and a controller 7 which inputs operation data to the game apparatus 3. Two markers 8a and 8b are provided in the vicinity of the monitor 2 (e.g., on an upper side of the screen in FIG. 1). Specifically, the markers 8a and 8b are infrared LEDs which output infrared light toward the front of the monitor 2. The game apparatus 3 is connected via a connection terminal to a reception unit 6. The reception unit 6 receives operation data wirelessly transmitted from the controller 7, so that the controller 7 and the game apparatus 3 are connected together via wireless communication. Note that, in other embodiments, the controller 7 and the game apparatus 3 are connected together via wired communication. An optical disc 4 which is an exemplary information storing medium changeable with respect to the game apparatus 3, is detachably attached to the game apparatus 3. On an upper major surface of the game apparatus 3, a power ON/OFF switch for the game apparatus 3, a reset switch for a game process, and an OPEN switch for opening an upper lid of the game apparatus 3, are provided. Here, the lid is opened by a player pushing down the OPEN switch, so that the optical disc 4 can be attached or detached.

An external memory card 5 carrying, for example, a backup memory for fixedly storing saved data or the like, is detachably attached to the game apparatus 3 as required. The game apparatus 3 executes a game program or the like stored on the optical disc 4, and displays a result of the execution as a game image on the monitor 2. The game apparatus 3 can also reproduce a game state which was executed in the past, using saved data stored in the external memory card 5, and display a game image on the monitor 2. The player of the game apparatus 3 can enjoy events of the game by operating the controller 7 while watching a game image displayed on the monitor 2.

The controller 7 wirelessly transmits operation data from a communication section 36 (described below) included therein to the game apparatus 3 to which the reception unit 6 is connected, using, for example, a Bluetooth® technique. The controller 7 is an operation means for operating an object to be operated (an object displayed on the monitor 2). The controller 7 is provided with an operation section composed of a plurality of operation buttons. As will be clearly described below, the controller 7 comprises an image capture information computing section 35 (described below) for capturing an image viewed from the controller 7. Specifically, the image capture information computing section 35 captures an image of each of the markers 8a and 8b provided in the vicinity of the monitor 2 as objects to be captured. The game apparatus 3 obtains an operation signal corresponding to a position and an attitude of the controller 7, based on these images.

Next, a configuration of the game apparatus 3 will be described with reference to FIG. 2. Note that FIG. 2 is a functional block diagram of the game apparatus 3.

Figure 2:
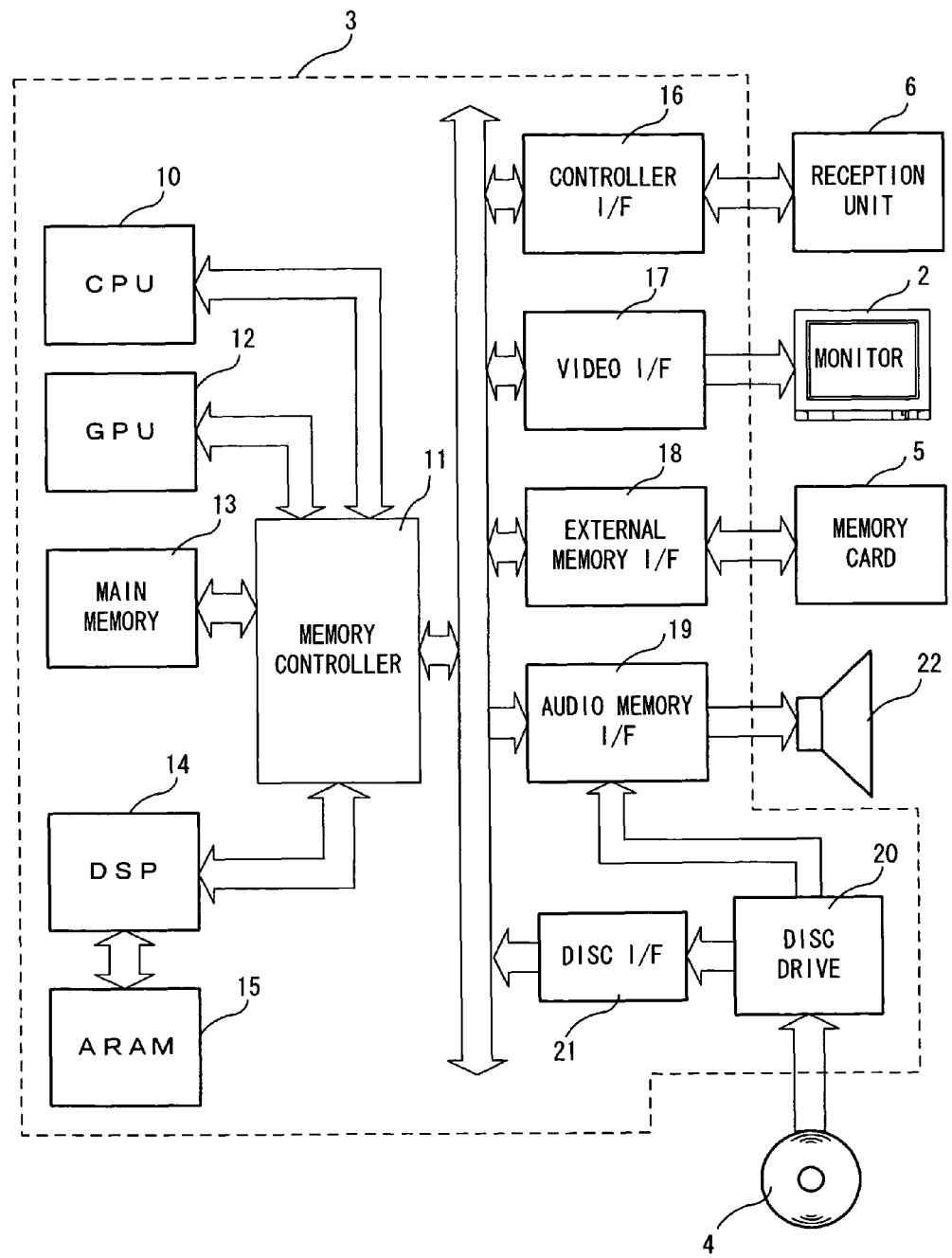
FIG. 2 is a functional block diagram of a game apparatus 3.

In FIG. 2, the game apparatus 3 comprises, for example, a RISC CPU (central processing unit) 10 which executes various programs. The CPU 10 executes a start-up program stored in a boot ROM (not shown) and performs, for example, initialization of memories, such as a main memory 13 and the like, before executing a game program stored in the optical disc 4, and performing, for example, a game process corresponding to the game program. A GPU (Graphics Processing Unit) 12, the main memory 13, a DSP (Digital Signal Processor) 14, and an ARAM (Audio RAM) 15 are connected via a memory controller 11 to the CPU 10. A controller I/F (interface) 16, a video I/F 17, an external memory I/F 18, an audio I/F 19, and a disc I/F 21 are connected via a predetermined bus to the memory controller 11. The reception unit 6, the monitor 2, the external memory card 5, a loudspeaker 22, and a disc drive 20 are connected to the controller I/F 16, the video I/F 17, the external memory I/F 18, the audio I/F 19, and the disc I/F 21, respectively.

The GPU 12 performs image processing based on an instruction from the CPU 10, and is composed of, for example, a semiconductor chip which performs a computation process required for 3D graphics display. The GPU 12 performs image processing using a memory specialized for image processing or a memory area which is a portion of the main memory 13. The GPU 12 uses these to generate game image data or movie video to be displayed on the monitor 2, and outputs the data via the memory controller 11 and the video I/F 17 to the monitor 2 as appropriate.

The main memory 13 is a memory area used in the CPU 10, and stores a game program or the like required for a process by the CPU 10 as appropriate. For example, the main memory 13 stores a game program, various data, or the like read from the optical disc 4 by the CPU 10. The game program, the various data, or the like stored in the main memory 13 are executed by the CPU 10.

The DSP 14 processes sound data or the like which is generated in the CPU 10 when a game program is executed. The ARAM 15 for storing the sound data or the like is connected to the DSP 14. The ARAM 15 is used when the DSP 14 performs a predetermined process (e.g., storage of a read-ahead game program or sound data). The DSP 14 reads sound data stored in the ARAM 15, and outputs the data via the memory controller 11 and the audio I/F 19 to the loudspeaker 22 included in the monitor 2.

The memory controller 11 performs a centralized control of data transfer. The above-described various I/F are connected to the memory controller 11. The controller I/F 16 is composed of, for example, four controller I/Fs, and communicably connects an external apparatus which can be engaged with the four controller I/Fs via connectors thereof, and the game apparatus 3. For example, the reception unit 6 is engaged with the connector to be connected via the controller I/F 16 to the game apparatus 3. As described above, the reception unit 6 receives operation data from the controller 7, and outputs the operation data via the controller I/F 16 to the CPU 10. Note that, in other embodiments, the game apparatus 3 may comprise a reception module for receiving operation data transmitted from the controller 7, instead of the reception unit 6. In this case, the operation data received by the reception module is output via a predetermined bus to the CPU 10. The monitor 2 is connected to the video I/F 17. The external memory card 5 is connected to the external memory I/F 18, thereby making it possible to access the backup memory or the like provided in the external memory card 5. The loudspeaker 22 included in the monitor 2 is connected to the audio I/F 19 so that sound data read from the ARAM 15 by the DSP 14 or sound data directly output from the disc drive 20 can be output from the loudspeaker 22. The disc drive 20 is connected to the disc I/F 21. The disc drive 20 reads data stored at a predetermined read-out position on the optical disc 4, and outputs the data to the bus and the audio I/F 19 of the game apparatus 3.

Figure 3A:
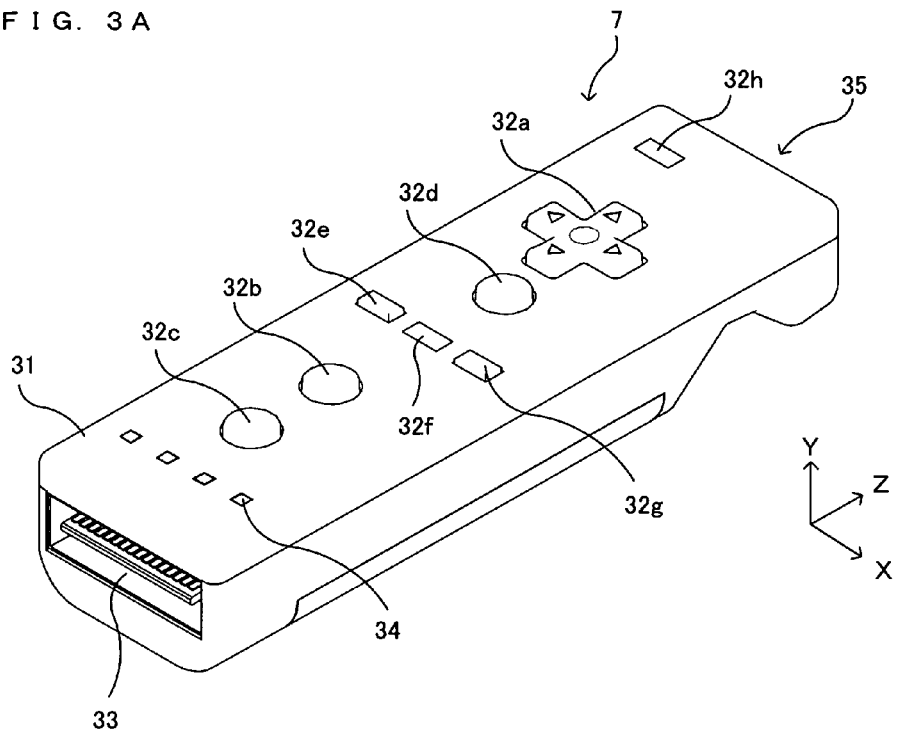
FIG. 3A is a perspective view of a controller 7.
Figure 3B:
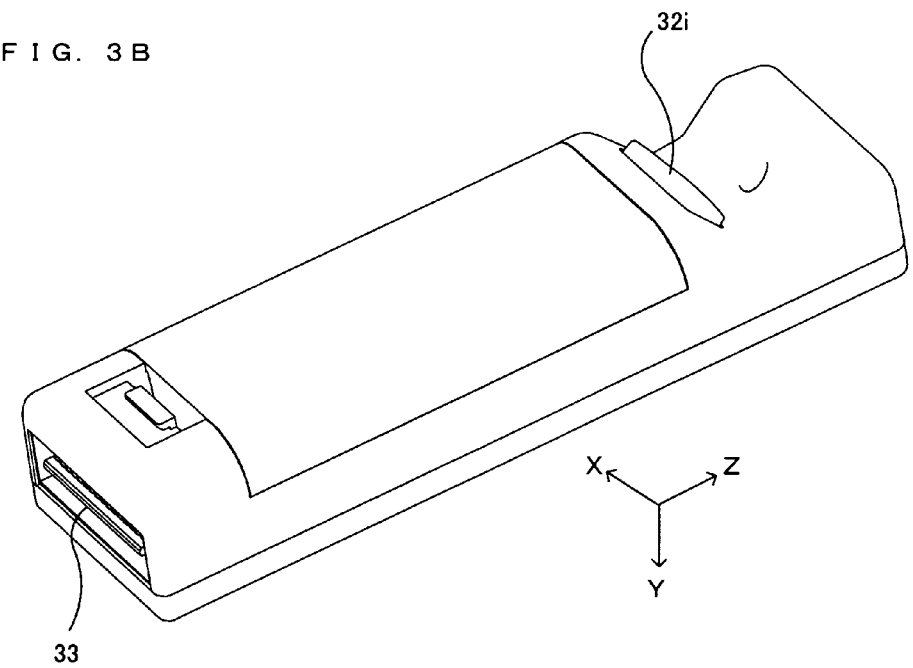
FIG. 3B is a perspective view of the controller 7.

Next, the controller 7 will be described with reference to FIGS. 3A to 6. FIGS. 3A to 4 are perspective views of an outer appearance structure of the controller 7. FIG. 3A is a perspective view of the controller 7 as viewed from the top and the rear, and FIG. 3B is a perspective view of the controller 7 as viewed from the bottom and the rear. FIG. 4 is a front view of the controller 7.

In FIGS. 3A and 3B and FIG. 4, the controller 7 has a housing 31 formed by, for example, plastic molding. The housing 31 is in the shape of substantially a rectangular parallelepiped in which a front-to-rear direction (a Z-axis direction in FIGS. 3A and 3B) is a longitudinal direction. The whole housing 31 has a size which allows an adult and a child to hold the controller 7 with one hand. The player can perform game operations by using the controller 7, i.e., pushing down buttons provided on the controller 7, or changing a position and an attitude of the controller 7 itself. For example, the player can cause the object to be operated to perform a movement operation by rotating the controller 7 around the longitudinal direction as an axis, or can move an object appearing in a game space by changing a position on the screen which is pointed by the controller 7. As used herein, the term "position on the screen which is pointed by the controller 7" ideally refers to a position of an intersection of a straight line extending from a front end of the controller 7 in the longitudinal direction and the screen of the monitor 2, but does not need to be exactly such a position, and may be a position which is in the vicinity thereof and can be calculated by the game apparatus 3. Hereinafter, a position on the screen which is pointed by the controller 7 is referred to as a "pointed position of the controller 7". The longitudinal direction of the controller 7 (the housing 31) may be referred to as a "pointing direction of the controller 7".

The housing 31 is provided with a plurality of operation buttons. On an upper surface of the housing 31, a cross key 32a, an X button 32b, an Y button 32c, a B button 32d, a select switch 32e, a menu switch 32f, and a start switch 32g are provided. On the other hand, a hollow portion is formed on a lower surface of the housing 31, and an A button 32i is provided on a rear slope surface of the hollow portion. These operation buttons (switches) are assigned with respective functions, depending on a game program executed by the game apparatus 3. These functions are not directly involved with the description of the exemplary embodiments and will not be described in detail. Further, a power switch 32h for remotely switching ON/OFF the power source of the game apparatus 3 is provided on the upper surface of the housing 31.

Figure 5A:
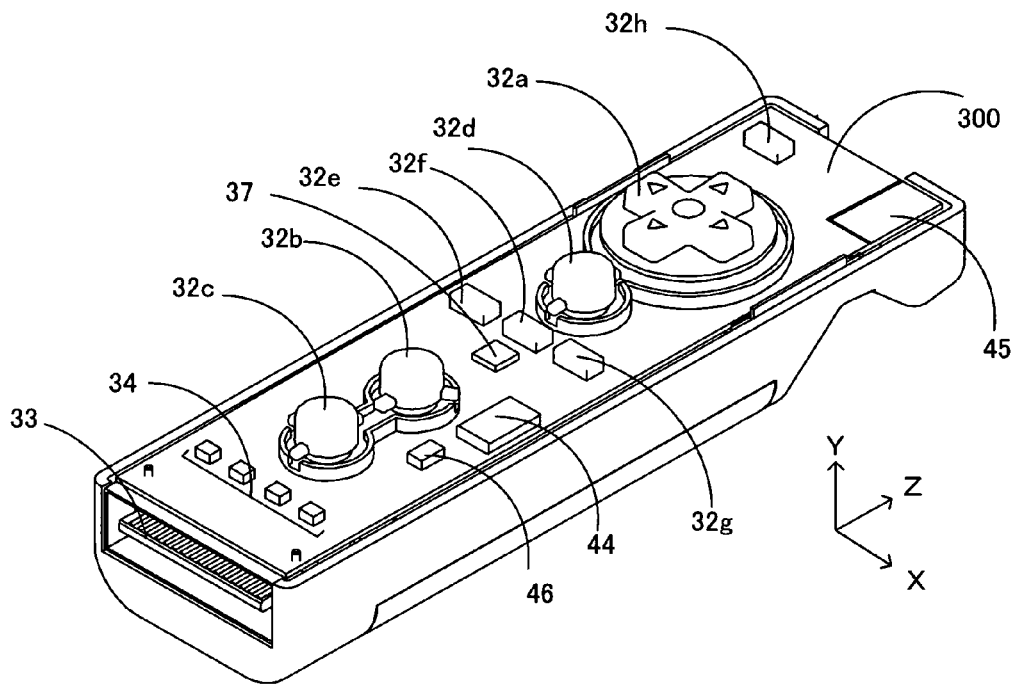
FIG. 5A is a diagram illustrating an internal structure of the controller 7.
Figure 5B:
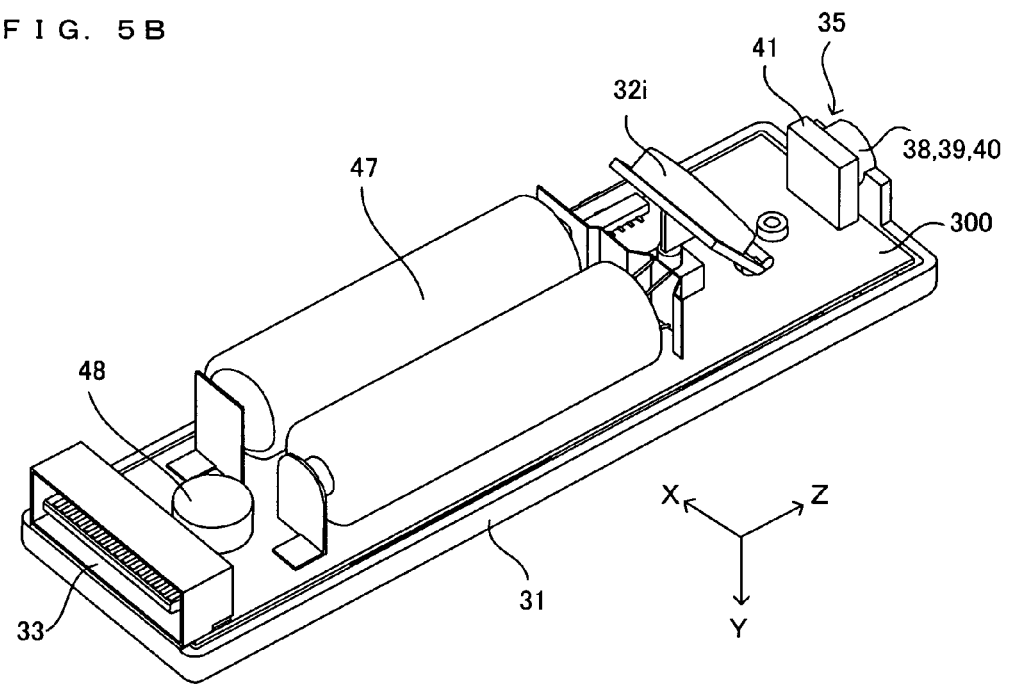
FIG. 5B is a diagram illustrating an internal structure of the controller 7.

The controller 7 has the image capture information computing section 35 (FIG. 5B). As illustrated in FIG. 4, a light entering opening 35a of the image capture information computing section 35 is provided on a front surface of the housing 31. On the other hand, a connector 33 is provided on a rear surface of the housing 31. The connector 33 is, for example, a 32-pin edge connector which is utilized so as to connect other apparatuses to the controller 7. A plurality of LEDs 34 are provided on a rear side of the upper surface of the housing 31. Here, the controller 7 is assigned with controller identification (number) so as to distinguish it from other controllers 7. The LEDs 34 are used so as to inform the player of controller identification currently set for the controller 7. Specifically, when operation data is transmitted from the controller 7 to the game apparatus 3, one of the plurality of LEDs 34 is turned ON, depending on the controller identification.

Next, an internal structure of the controller 7 will be described with reference to FIGS. 5A and 5B and FIG. 6. FIGS. 5A and 5B are diagrams illustrating the internal structure of the controller 7. Note that FIG. 5A is a perspective view of the controller 7 where an upper housing (a portion of the housing 31) is cut away. FIG. 5B is a perspective view of the controller 7 where a lower housing (a portion of the housing 31) is cut away. FIG. 5B illustrates a perspective view of a base board 300 of FIG. 5A as viewed from a bottom surface thereof.

In FIG. 5A, the base board 300 is fixedly provided inside the housing 31. On an upper major surface of the base board 300, operation buttons 32a to 32h, an acceleration sensor 37, the LEDs 34, a quartz oscillator 46, a radio module 44, an antenna 45, and the like are provided. These are connected to a microcomputer 42 (see FIG. 6) via a conductor (not shown) formed on the base board 300 or the like. The controller 7 functions as a wireless controller by means of the radio module 44 and the antenna 45. Note that the quartz oscillator 46 generates a basic clock for the microcomputer 42 (described below).

On the other hand, in FIG. 5B, the image capture information computing section 35 is provided at a front edge of a lower major surface of the base board 300. The image capture information computing section 35 is composed of an infrared filter 38, a lens 39, an image capturing element 40, and an image processing circuit 41, which are attached to the lower major surface of the base board 300 in this order from the front of the controller 7. The connector 33 is attached to a rear edge of the lower major surface of the base board 300. The operation button 32i is attached at the rear of the image capture information computing section 35 and on the lower major surface of the base board 300. Batteries 47 are housed at the rear of the A button 32i. A vibrator 48 is attached on the lower major surface of the base board 300 and between the batteries 47 and the connector 33. The vibrator 48 may be, for example, a vibration motor or solenoid. Vibration occurs in the controller 7 by an action of the vibrator 48, and is transferred to the player who is holding the controller 7, thereby achieving a so-called game supporting the vibration feature.

FIG. 6 is a block diagram illustrating a configuration of the controller 7. The controller 7 comprises a communication section 36 and an acceleration sensor 37 in addition to the operation section 32 (operation buttons) and the image capture information calculating section 35, which are described above.

The image capture information computing section 35 is a system for analyzing image data captured by the image capturing means to determine a place having a high luminance and detect a center-of-gravity position or a size of the place. The image capture information computing section 35 has, for example, a maximum sampling cycle of about 200 frames/sec, and therefore, can track and analyze relatively high-speed movement of the controller 7.

Specifically, the image capture information computing section 35 includes the infrared filter 38, the lens 39, the image capturing element 40, and the image processing circuit 41. The infrared filter 38 passes only infrared light entering from the front of the controller 7. Here, the markers 8a and 8b provided in the vicinity of the display screen of the monitor 2 are infrared LEDs which output infrared light toward the front of the monitor 2. Therefore, by providing the infrared filter 38, the images of the markers 8a and 8b can be more correctly captured. The lens 39 collects infrared light passing through the infrared filter 38 and causes the light to enter the image capturing element 40. The image capturing element 40 may be, for example, a solid-state image capturing element, such as a CMOS sensor or a CCD, and captures infrared light collected by the lens 39. Therefore, the image capturing element 40 captures only infrared light passing through the infrared filter 38 to generate image data. Hereinafter, an image captured by the image capturing element 40 is referred to as a captured image. The image data generated by the image capturing element 40 is processed by the image processing circuit 41. The image processing circuit 41 calculates positions of objects whose images are to be captured (markers 8a and 8b) in the captured image. The image processing circuit 41 outputs coordinate values indicating the positions of the markers 8a and 8b in the captured image, as captured image data, to the communication section 36. Therefore, the game apparatus 3 can detect a rotational angle about a Z axis of the controller 7 from the captured image.

The acceleration sensor 37 detects values of linear accelerations along directions of sensing axes and a gravitational acceleration, of accelerations applied to a detection portion of the acceleration sensor. For example, in the case of a two- or three-axis acceleration sensor, an acceleration applied to the detection portion of the acceleration sensor is detected as a linear acceleration along each axis. In this example, accelerations are detected with respect to three axes: a vertical direction (Y-axis direction in FIGS. 3A and 3B); a lateral direction (X-axis direction in FIGS. 3A and 3B); and a front-to-rear direction (Z-axis direction in FIGS. 3A and 3B), of the controller 7. The acceleration sensor detects a linear acceleration along each axis, and cannot directly detect a rotation or a tilt. Therefore, a rotation and a tilt of the attitude of the controller 7 carrying the acceleration sensor 37 are calculated by performing a predetermined computation process with respect to an acceleration detected along each axis of the acceleration sensor 37. Note that the acceleration sensor 37 may be an acceleration sensor which detects an acceleration with respect to each of two axes (the vertical direction and the lateral direction), depending on the type of a required operation signal. Data indicating accelerations detected by the acceleration sensor 37 is output to the communication section 36.

The communication section 36 includes the microcomputer 42, a memory 43, the radio module 44, and the antenna 45. The microcomputer 42 controls the radio module 44 which wirelessly transmits data obtained by the microcomputer 42, while using the memory 43 as a memory area.

Data output from the operation section 32, the acceleration sensor 37, and the image capture information computing section 35 to the microcomputer 42 is temporarily stored in the memory 43. Here, wireless transmission from the communication section 36 to the reception unit 6 is performed in predetermined cycles. Since a game process is generally performed in units of 1/60 (sec), transmission needs to be performed in cycles which are shorter than 1/60 (sec). When the timing of transmission to the reception unit 6 arrives, the microcomputer 42 outputs data stored in the memory 43 as operation data to the radio module 44. The radio module 44 uses, for example, the Bluetooth® technique to modulate a carrier wave having a predetermined frequency with the operation data, and emits a resultant weak radio wave signal from the antenna 45. In other words, the operation data is modulated by the radio module 44 into the weak radio wave signal, which is in turn transmitted from the controller 7. The weak radio wave signal is received by the reception unit 6 on the game apparatus 3 side. By demodulation or decoding of the received weak radio wave signal, the game apparatus 3 can obtain the operation data. The CPU 10 of the game apparatus 3 performs a game process based on the obtained operation data and a game program.

By using the controller 7, the player can perform game operations, such as moving the position of the controller 7 itself, rotating the controller 7, and the like, in addition to a conventional general game operation of pushing down various operation switches.

Figure 7:
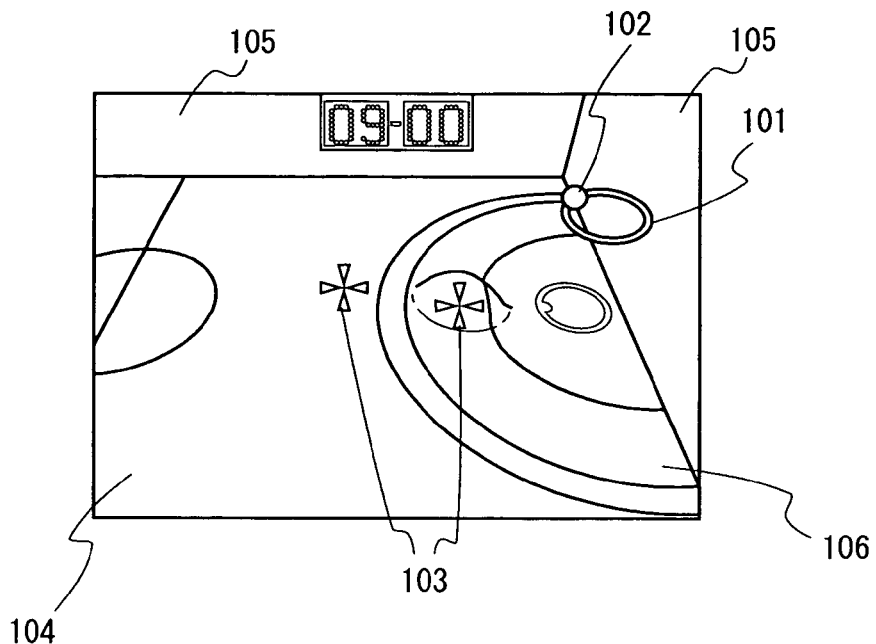
FIG. 7 is a diagram illustrating an exemplary screen of a game assumed in an exemplary embodiment.
Figure 8:
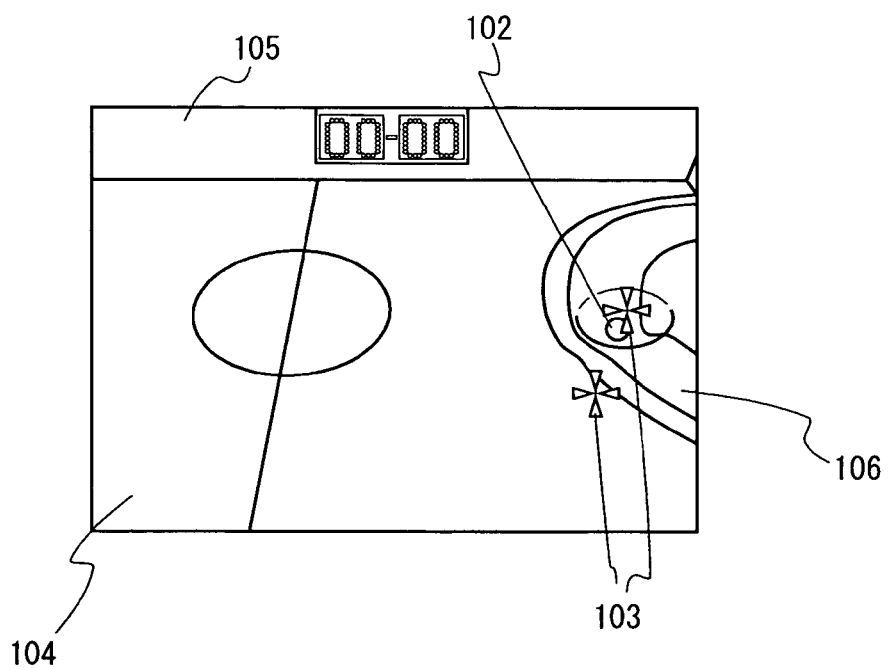
FIG. 8 is a diagram illustrating an exemplary screen of a game assumed in an exemplary embodiment.
Figure 9:
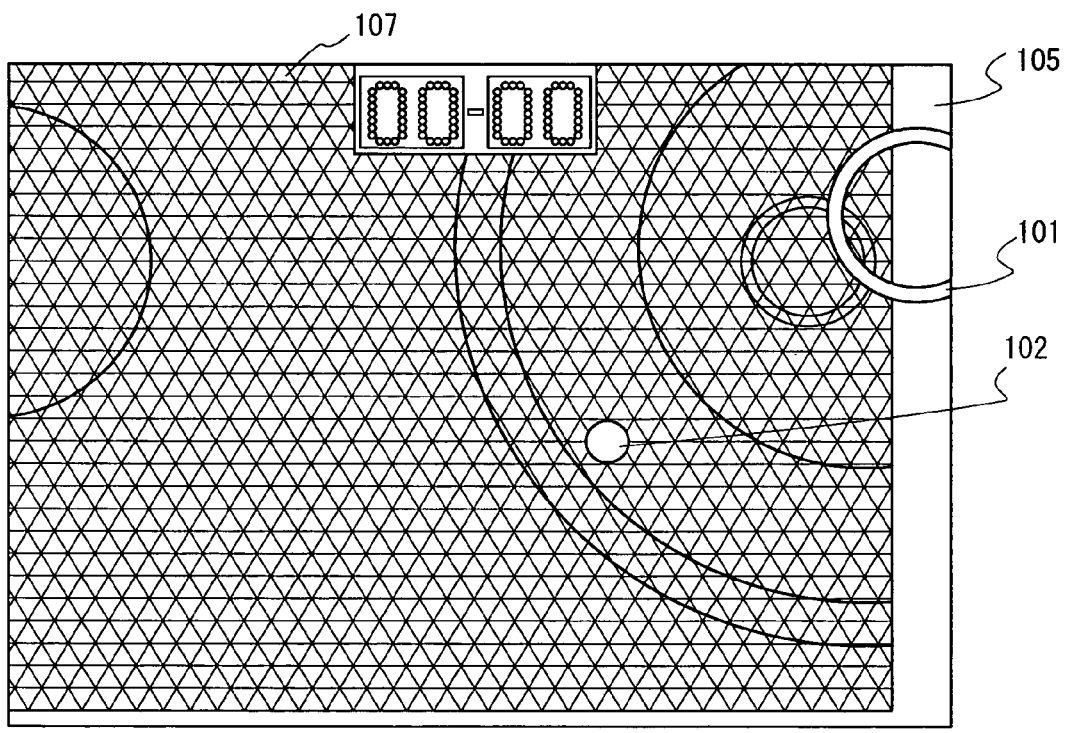
FIG. 9 is a top view of a ground 104.

Next, an outline of a game which is assumed in this embodiment, will be described with reference to FIGS. 7 to 9. FIGS. 7 and 8 illustrate exemplary screens of the game assumed in this embodiment. The game is a basketball game which is performed between two players. In FIG. 7, on the game screen, a ring 101, a ball 102, cursors 103 (one for each of a player 1 and a player 2), a ground 104, and a wall 105 are provided. A shooting permitted area 106 is provided on the ground 104. On such a game screen, a player moves a cursor 103. When the A button is pressed, the ground in the vicinity of a position pointed by the cursor 103 is bulged as in FIG. 7. In this case, if the ball 102 contacts the ground in the vicinity of the position pointed by the cursor 103, the ball 102 can be thrown. Also, when the B button is pressed, the ground in the vicinity of the position pointed by the cursor 103 is dented as in FIG. 8. In this case, if the ball 102 contacts the ground in the vicinity of the position pointed by the cursor 103, the ball 102 can be held in the dent. When the cursor 103 is moved while keeping pressing these buttons, the bulge and dent are also moved, following the cursor 103. Therefore, the ball 102 can be carried by creating a dent and moving the dent while holding the ball 102 in the dent. Also, if the ball 102 is within the shooting permitted area 106, the ball 102 can be thrown (i.e., shooting) toward the ring 101 by bulging the ground corresponding to the ball 102 (see FIG. 7). Thus, the players compete against each other in score by moving or taking the ball 102 and throwing the ball 102 through the opponent's ring 101 while moving the cursor 103 and bulging or denting the ground 104.

Note that the ground 104 and the wall 105 are formed of polygons. FIG. 9 is a top view of the ground 104, indicating the polygons with wire frames. As illustrated in FIG. 9, the ground 104 is completely covered with the polygons 107 (equilateral triangles).

Next, before a game process of this embodiment is described in detail, main parameters used in the process will be described. Initially, each vertex of the polygons 107 constituting the ground 104 (FIG. 9) has the following parameters:

(1) an XYZ position (posX, posY, posZ) indicating a position of the vertex in a virtual game space;

(2) a Y velocity (velY) indicating a movement velocity in a Y direction of the vertex; and (3) a shoot flag indicating that shooting is permitted.

At a vertex for which the flag is set, when a process of moving the ball 102 (described below) is performed, a movement direction and a velocity of the ball 102 are corrected so that the ball 102 is likely to be thrown through the ring 101 (i.e., a track of the ball 102 is corrected so that a shooting operation is obtained).

Overlapping vertices of adjacent polygons 107 are collectively handled as a single vertex.

The ball 102 has the following parameters:

(1) an XYZ position (ballPosX, ballPosY, ballPosZ) indicating a position in the virtual game space of the ball 102; and (2) an XYZ velocity (ballVelX, ballVelY, ballVelZ) indicating a movement velocity in each of X, Y and Z directions of the ball 102.

Note that each of the above-described parameters is stored in the main memory 13. In addition to these, the main memory 13 stores various parameters required for the game process, such as score counts of the players 1 and 2, and the like.

Figure 10:
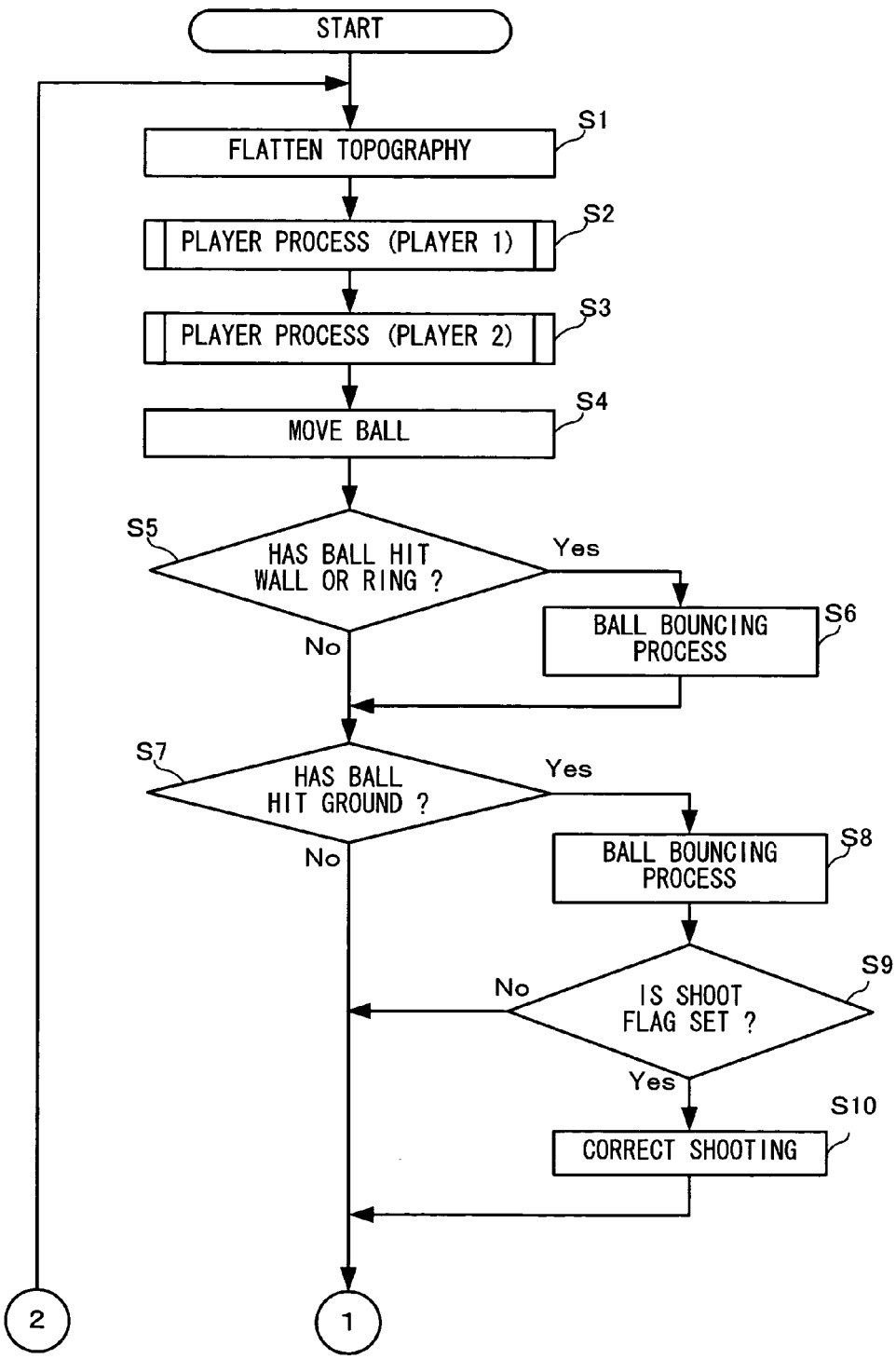
FIG. 10 is a flowchart illustrating a flow of a game process executed by the game apparatus 3.
Figure 11:
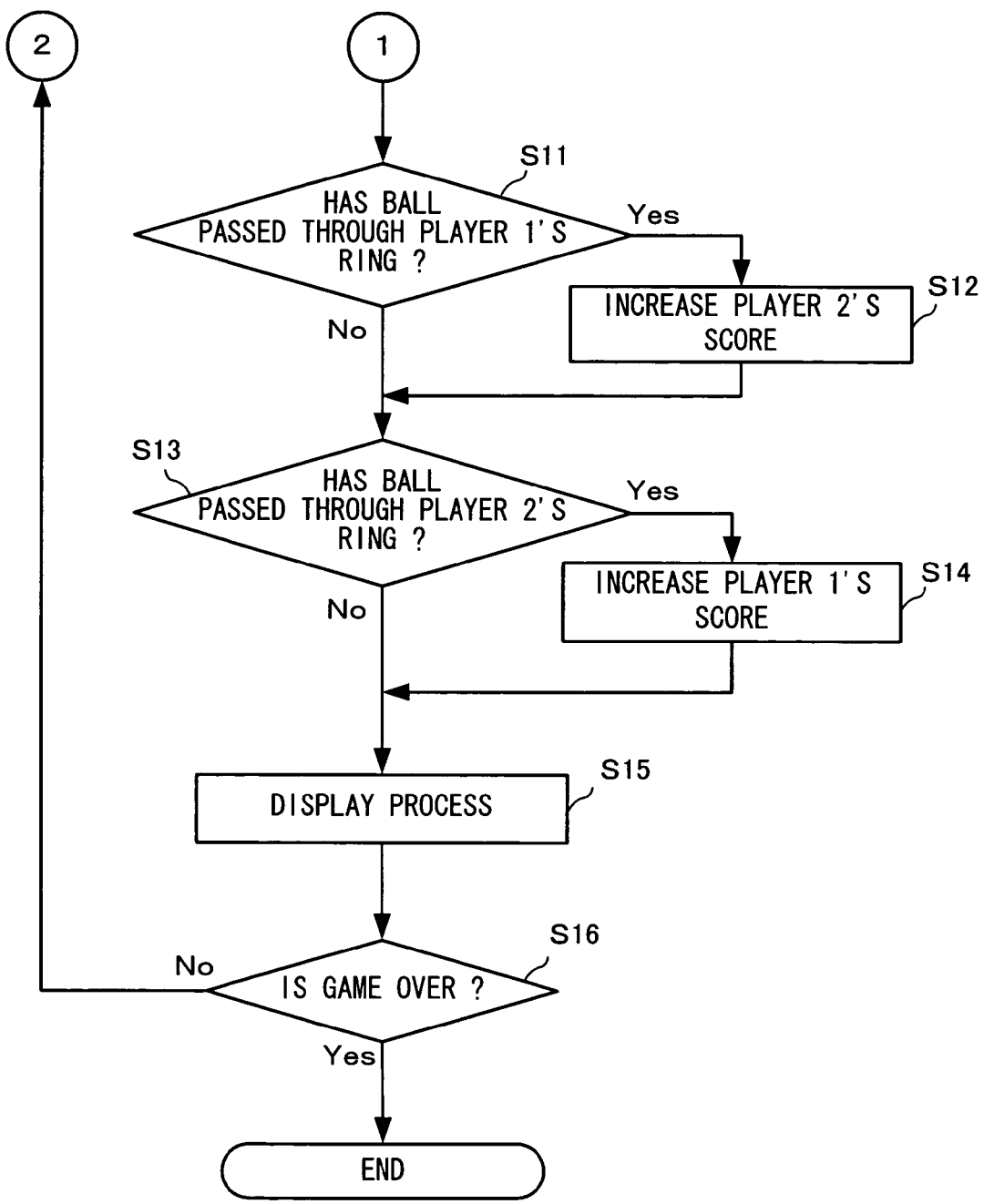
FIG. 11 is a flowchart illustrating a flow of a game process executed by the game apparatus 3.

Next, a flow of the game process executed in the game apparatus 3 will be described with reference to FIGS. 10 to 17. FIGS. 10 and 11 are flowcharts illustrating the flow of the game process executed in the game apparatus 3. When the game apparatus 3 is powered ON, the CPU 10 of the game apparatus 3 executes the boot program stored in the boot ROM (not shown), so that units, such as the main memory 13 and the like, are initialized. Thereafter, the game program stored in the optical disc 4 is read into the main memory 13, so that the execution of the game program is started. As a result, the game is started by a game image being displayed on the monitor 2 via the GPU 12. Thereafter, the process of the flowcharts of FIGS. 10 and 11 is executed. A process loop of steps S1 to S16 illustrated in FIGS. 10 and 11 is repeated per frame.

Figure 12:
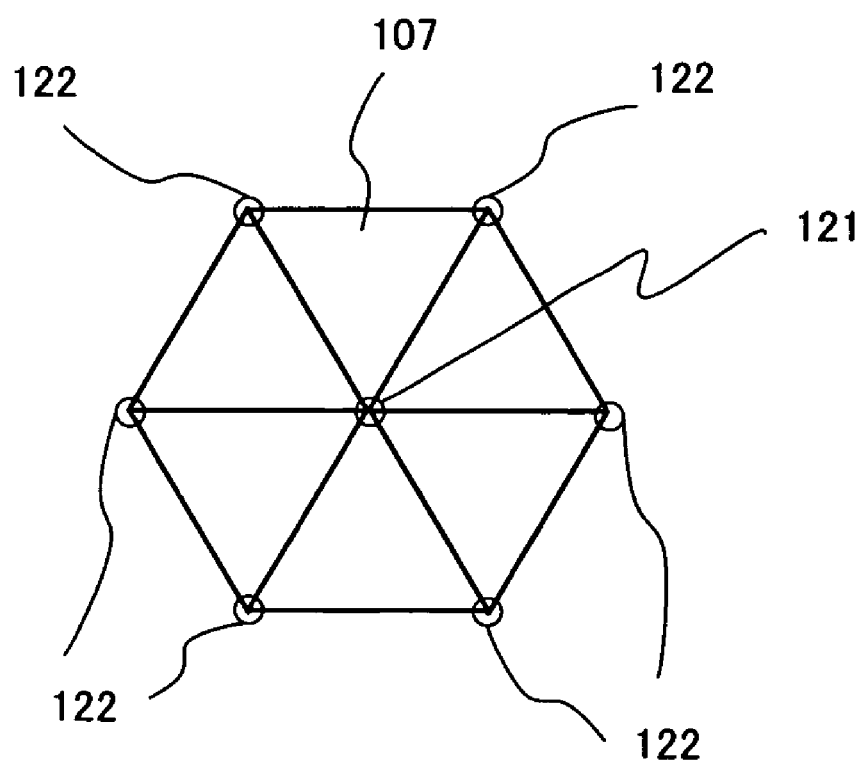
FIG. 12 is a diagram for explaining a process of flattening a ground.

In FIG. 10, initially, the CPU 10 performs a process of flattening the ground 104 (see FIG. 7, etc.) (step S1). This is a process for causing the deformed ground 104 to gradually become flat. In this process, as illustrated in FIG. 12, attention is given to a vertex 121 (hereinafter referred to as a vertex of interest) of the vertices of the polygons constituting the ground 104, and a process of causing a height of the vertex 121 to approach heights of six vertices 122 around the vertex 121. In other words, the height of the vertex of interest 121 approaches the heights of the six surrounding vertices 122. The process of step S1 will be described more specifically. Initially, a position of the vertex of interest 121 is updated using the current Y velocity (velY).

$$posY=posY+velY$$

Next, the Y velocity is attenuated by a predetermined factor (e.g., 0.7).

$$velY=velY\times0.7$$

Next, differences in height between the vertex of interest 121 and the six surrounding vertices 122 are calculated, and a sum SumS of the differences is obtained. The heights of the six surrounding vertices 122 are added (to some extent) to the Y velocity by:

$$velY=velY+SumS\times constant.$$

These computations are performed with respect to all pixels constituting the ground 104, thereby performing the flattening process.

Figure 13:
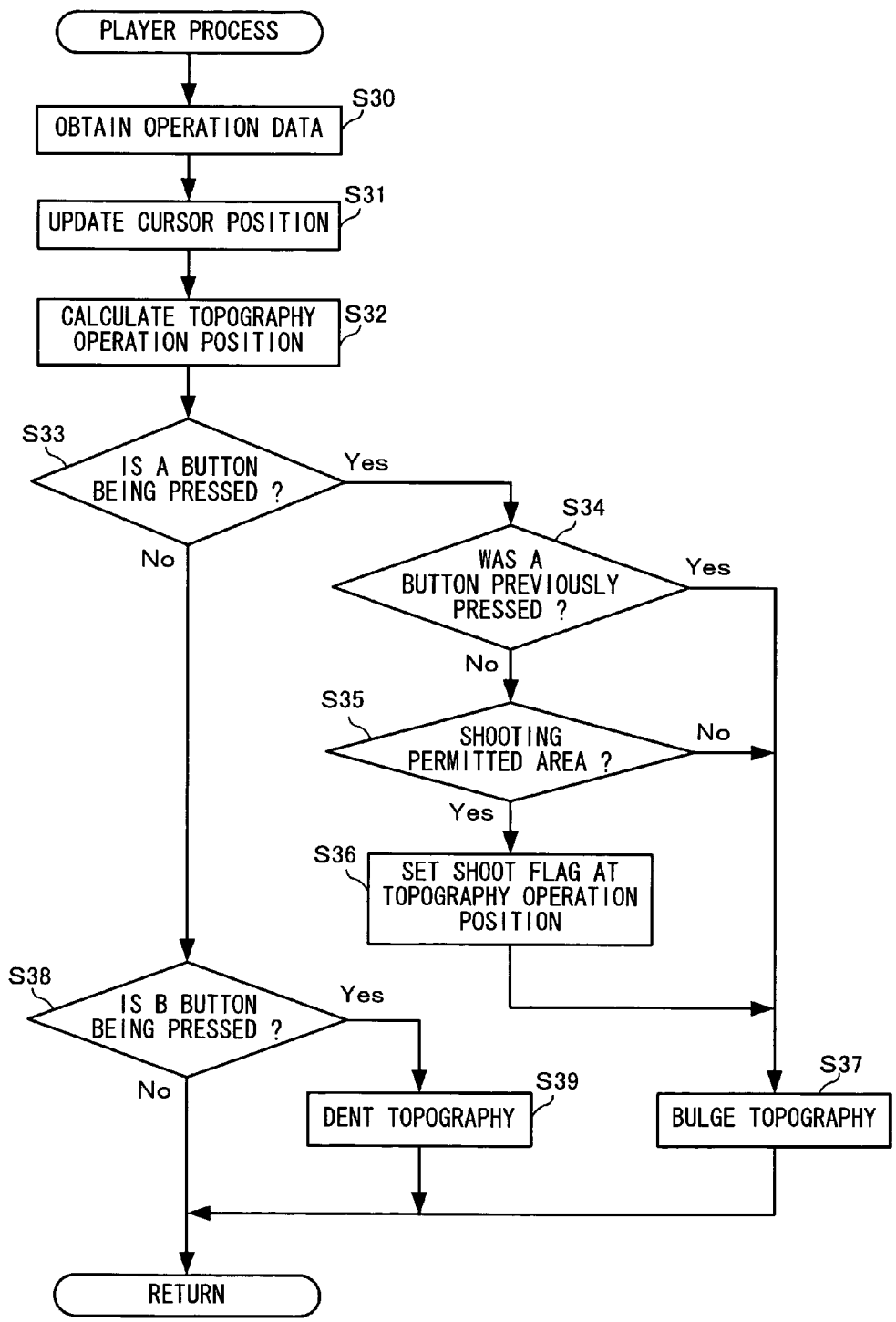
FIG. 13 is a flowchart illustrating a flow of a player process described in step 2 of FIG. 10.
Figure 14:
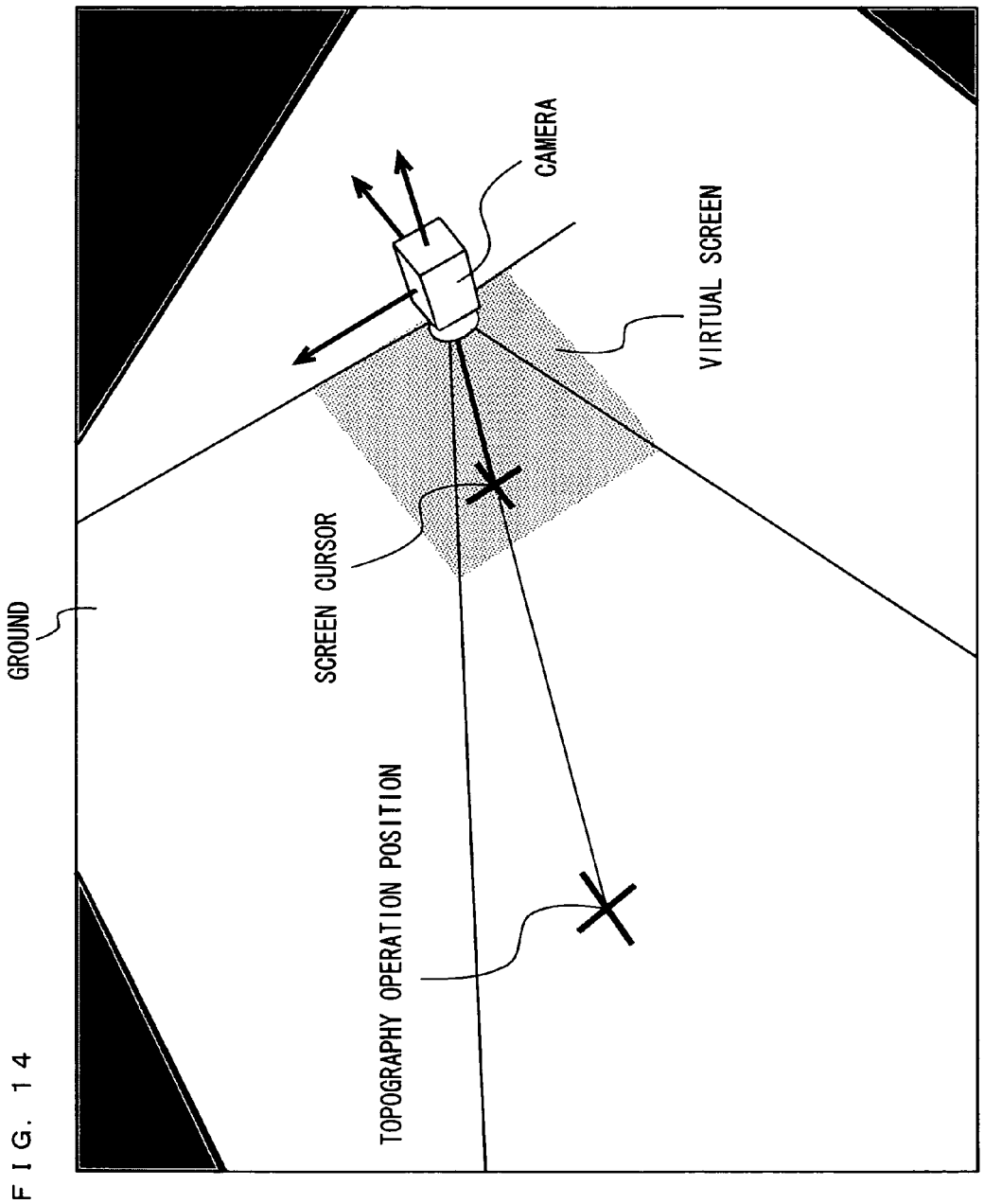
FIG. 14 is a diagram for explaining how to determine a topography operation position.

Next, a player process (step S2) is performed with respect to the player 1. In this process, a position on the ground 104 is calculated based on a position of the cursor 103 moved by the player 1, and a process of bulging or denting the ground 104 is performed. FIG. 13 is a flowchart illustrating the player process of step S2 in detail. In FIG. 13, initially, operation data transmitted from the controller 7 is obtained as described above (step S30). The operation data includes coordinate data indicating positions in a captured image of the markers 8*a* and 8*b*, and operation data of the A button and the B button.

Following this, the CPU 10 calculates input coordinates in a screen coordinate system of the monitor 2 based on the operation information obtained in step S30. Specifically, the coordinate values of a middle point between position coordinates of the markers 8*a* and 8*b* obtained in step S30, are calculated. Next, based on the coordinate values of the middle point thus calculated, the input coordinates on the screen are calculated. Thereafter, the CPU 10 stores the calculated input coordinates as screen coordinate data into the main memory 13. Next, the position of the cursor 103 on the screen is updated to a position indicated by the screen coordinate data (step S31).

Next, the CPU 10 calculates a position on topography in the virtual game space which corresponds to the position of the cursor 103 on the screen (hereinafter referred to as a topography operation position) (step S32). The process of step S32 will be described with reference to FIG. 14. Initially, a virtual screen is provided in a line-of-sight direction from a virtual camera. Next, a position where a line connecting between a position of the camera and a screen cursor position on the virtual screen (corresponding to the position indicating the screen coordinate data calculated in step S31) intersects the ground 104, is calculated. The intersection position thus calculated is referred to as a topography operation position. The topography operation position has an XYZ position (cX, cY, cZ) as a parameter indicating the position.

Referring back to FIG. 13, next, the CPU 10 determines whether or not the A button is being pressed, based on the operation information obtained in step S30 (step S33). When the A button is being pressed (YES in step S33), it is determined whether or not the A button was being pressed in a process for the previous frame (step S34). As a result, when the A button was being pressed, a topography bulging process described below is performed (step S37). When the A button was not being pressed, it is determined whether or not the topography operation position is within the shooting permitted area 106 (step S35). If the topography operation position is within the shooting permitted area 106, the shoot flag is set for vertices constituting a polygon 107 at the topography operation position (step S36).

Figure 15:
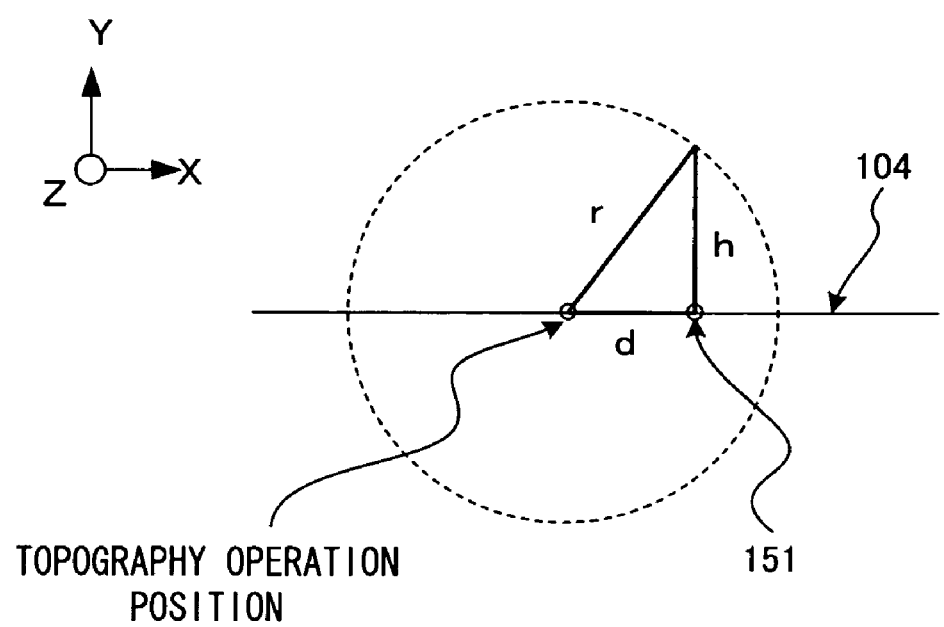
FIG. 15 is a diagram illustrating processes of bulging and denting topography.

Following this, the topography bulging process is performed (step S37). In this process, a Y velocity is added to vertices around the topography operation position, so that each vertex is moved in the Y direction (a direction perpendicular to the ground XZ, i.e., a vertical height direction of the ground 104). The process of step S37 will be specifically described with reference to FIG. 15. FIG. 15 illustrates a state of the ground 104 (polygons thereof) as viewed from a side thereof. The case where a vertex 151 is processed will be described as an example with reference to FIG. 15. Initially, an XZ distance d between the topography operation position (cX, cY, cZ) and the vertex 151 to be processed, is calculated by:

$$d=\sqrt{(posX-cX)^2+(posZ-cZ)^2}$$

As a result of the calculation, when the XZ distance d is larger than or equal to an operation radius r which is a predetermined constant, the topography bulging process is ended so that the height of the vertex 151 is not changed. On the other hand, when the XZ distance d is smaller than the operation radius r, a height h corresponding to the XZ distance d is calculated by the following expression so as to change the height of the vertex 151.

$$h=\sqrt{r^2-d^2} \quad (1)$$

Finally, a force proportional to a difference between posY and the height h is added to the Y velocity.

$$velY=velY+(h-posY)\times\text{(constant)}$$

Figure 16:
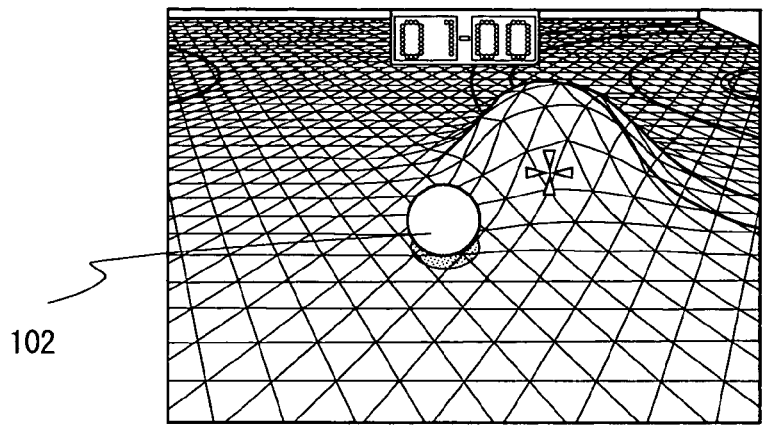
FIG. 16 is a diagram illustrating a bulged state of a ground.

These computations are performed for all the vertices constituting the ground 104. As a result, the closer the vertex is to the topography operation position, the higher the calculated position thereof, as illustrated in FIG. 16. In other words, the height gradually decreases with an increase in the distance from the topography operation position, i.e., the ground is bulged.

Referring back to FIG. 13, on the other hand, when the A button was not being pressed in step S33, the CPU 10 determines whether or not the B button is being pressed (step S38). When the B button is not being pressed, the player process is ended (NO in step S38). When the B button is being pressed (YES in step S38), a ground denting process is performed (step S39). In step S39, as in the bulging process of step S37, a Y velocity is added to the vertices around the topography operation position, so that each vertex is moved in the Y direction. Therefore, a process basically similar to that of step S37 is performed, but the direction of the calculated height is reverse compared to the case of the topography bulging process. Therefore, the height h is calculated by the following expression instead of the above-described expression (1).

$$h=\sqrt{r^2-d^2} \quad (2)$$

Figure 17:
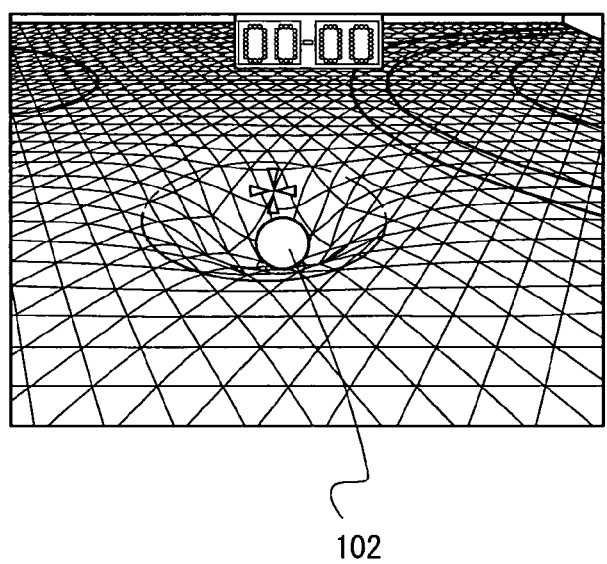
FIG. 17 is a diagram illustrating a dented state of a ground.

A process similar to that of step S37, except that this expression is used, is performed, and therefore, will not be described in detail. As a result of the process of step S39, the closer the vertex is to the topography operation position, the lower the calculated position thereof, as illustrated in FIG. 17. In other words, the height gradually increases with an increase in the distance from the topography operation position, i.e., the ground is dented. Thus, the player process is completed.

Referring back to FIG. 10, if the player process is ended with respect to the player 1, a player process is next performed with respect to the player 2 (step S3). This player process is similar to that of step S2, and will not be described in detail.

Following this, a process of moving the ball 102 is performed (step S4). Specifically, the following calculation is performed. Initially, the position of the ball 102 is updated based on the XYZ velocity of the ball 102 finally calculated in the previous process loop. Specifically, the following calculation is performed.

ball*PosX*=ball*PosX*+ball*VelX* ball*posY*=ball*posY*+ball*VelY* ball*PosZ*=ball*PosZ*+ball*VelZ*

Following this, a gravity vector (gX, gY, gZ) is added to the velocity. In other words, the values of the velocity are updated by adding the gravity vector. As used herein, the gravity vector refers to a vector pointing immediately downward in the virtual game space.

ball*VelX*=ball*VelX*+gX ball*VelY*=ball*VelY*+gY ball*VelZ*=ball*VelZ*+gZ

Thus, a new position of the ball 102 is calculated, and the ball moving process is ended.

Next, it is determined whether or not the ball 102 has hit the wall 105 or the ring 101 (step S5). Specifically, it is determined whether or not the new position where the ball 102 is shifted overlaps a position of the wall 105 or the ring 101. As a result, when the ball 102 has not hit the wall 105 or the ring 101 (NO in step S5), the process goes to step S7. On the other hand, when the ball 102 has hit the wall 105 or the ring 101 (YES step S5), a ball bouncing process is performed (step S6). The process of step S6 will be specifically described. The following calculation is performed for each of polygons constituting the wall 105 or the ring 101. Initially, a normal vector (nX, nY, nZ) of each polygon is calculated, and it is determined whether or not the ball 102 is located so that it encroaches the polygon. As a result, when the ball 102 does not encroach the polygon, the bouncing process is ended. In other words, the ball 102 does not bounce. On the other hand, when the ball 102 is located so that it encroaches the polygon, the encroaching depth is detected (depth). Next, the position of the ball 102 is modified in the normal direction of the polygon using the following expression.

ball*PosX*=ball*PosX*+nX×depth ball*posY*=ball*posY*+nY×depth ball*PosZ*=ball*PosZ*+nZ×depth Following this, a normal direction component vSpeed of the velocity of the ball 102 is calculated using the following expression.

vSpeed=ball*VelX*×nX+ball*VelY*×nY+ball*VelZ*×nZ

Next, the XYZ velocity of the ball 102 is calculated using the following expression. In other words, the velocity of the ball 102 when it bounces is calculated.

ball*VelX*=ball*VelX*−vSpeed×(1.0+k)×nX  (3)

ball*VelY*=ball*VelY*−vSpeed×(1.0+k)×nY  (4)

ball*VelZ*=ball*VelZ*−vSpeed×(1.0+k)×nZ  (5)

In these expressions, k represents a coefficient of restitution.

Thus, the bouncing process of step S6 is completed.

Following this, it is determined whether or not the ball 102 contacts the ground 104 (step S7). As a result, when the ball 102 contacts the ground 104, a bouncing process is performed (step S8). In the bouncing process of step S8, a calculation in which a movement velocity of a polygon is added to the velocity of the ball 102, is performed in addition to the above-described calculations in step S6. Specifically, for example, assuming that the ball 102 is in a dented ground, when the ground is bulged, a calculation for adding the movement of the bulging ground (the movement velocity of polygons constituting the ground) (to some extent) to the parameters of the ball 102, is performed. Specifically, after the velocity of the ball 102 is calculated as described above (expressions (3) to (5)), a calculation is further performed as follows. Initially, a movement velocity faceVelY in the Y direction of a polygon which the ball 102 contacts, is calculated. This is an average value of the velocities VelY of three vertices constituting the polygon. Thereafter, the movement velocity faceVelY of the polygon is added (to some extent) to the velocity of the ball 102.

$$ballVelX=ballVelX+nX \times faceVelY$$

$$ballVelY=ballVelY+nY \times faceVelY$$

$$ballVelZ=ballVelZ+nZ \times faceVelY$$

By performing the above-described computations, it is possible to express a bouncing motion of the ball 102, depending on the shape of the ground 104. Thus, the bouncing process of step S8 is completed.

Next, it is determined whether or not the shoot flag is set in any of the three vertices constituting the polygon at the topography operation position (step S9). As a result, when the shoot flag is set (YES in step S9), the velocity or movement direction of the ball 102 is corrected so that the ball 102 is likely to be thrown through the ring 101 (step S10). More specifically, the XYZ velocity of the ball 102 is corrected, taking into consideration a relationship between the topography operation position and a position of the ring 101. Regarding the correction, a table in which position relationships are associated with correction values is previously prepared in a memory or the like, and based on the table, the XYZ velocity of the ball 102 is corrected.

Next, it is determined whether or not the ball 102 has passed through the player 1's ring 101 (step S11). As a result, if the ball 102 has passed through the player 1's ring 101 (YES in step S11), the player 2's score is increased (step S12). On the other hand, if the ball 102 has not passed through the player 1's ring 101 (NO in step S11), it is determined whether or not the ball 102 has passed through the player 2's ring 101 (step S13). As a result, if the ball 102 has not passed through the player 2's ring 101 (NO in step S13), the process directly goes to step S15. On the other hand, if the ball 102 has passed through the player 2's ring 101 (YES in step S13), the player 1's score is increased (step S14) before the process goes to step S15.

Next, in step S15, a display process is performed. Specifically, an image captured by the virtual camera in the virtual space is displayed as a game image on the monitor 2. After step S15, it is determined in step S16 whether or not the game is over. If the result of the determination is YES, the game process is ended. If the result of the determination is NO, the process returns to step S1, and the game process is repeated. Thus, the game process of this embodiment is completed.

Thus, in the first embodiment, a ball can be indirectly moved by directly designating and deforming topography. Thereby, a game which employs a novel operation method which is not achieved in the conventional art, can be provided. The deformation of the topography composed of polygons is represented by computation of positions of vertices of the polygons. Therefore, a change in shape of the topography can be represented in a more realistic manner. The movement direction of a ball is determined based on the normal vectors and the gravity vectors of polygons of the deformed topography. Therefore, a state of movement of a ball in various directions can be more naturally expressed, depending on a change in topography. Also, when shooting is performed, the track of a ball is corrected so that the ball is likely to be thrown through a ring. Thereby, the operability and tempo of a game can be improved.

Note that, regarding the designated position, the cursor 103 is moved in the screen coordinate system in the above-described embodiment. Specifically, the cursor 103 is moved on the screen of the monitor 2. The exemplary embodiments are not limited to this. Alternatively, the cursor 103 may be moved on a ground in a virtual game space. FIG. 18 is a diagram illustrating how the cursor 103 is moved on a ground in a game space. In FIG. 18, the cursor 103 is displayed larger toward the front of the game space, i.e., is displayed smaller toward the rear. Specifically, when the cursor 103 is moved from the front toward the rear, the cursor 103 is displayed smaller toward the rear. Also, the cursor 103 can be moved only on the ground, and when the cursor 103 has hit a wall, the cursor 103 cannot go deeper. Thus, when the cursor 103 is displayed so that the cursor 103 is moved directly on the ground, a player can more easily recognize a position which is designated by himself/herself.

In the above-described example, a position on a screen of a cursor is calculated based on position coordinates obtained by a controller capturing infrared light output from markers provided in the vicinity of a monitor. The exemplary embodiments are not limited to this. Other methods may be used. For example, the position on the screen of a cursor may be calculated based on a direction (up, down, right, and left) designated by operating the cross key 32s of the controller 7. Alternatively, a touch panel is provided on a monitor screen, the coordinates on the screen of a position designated by touching the monitor using a finger, a pen or the like may be detected using the touch panel, and the detected coordinates may be assumed as a cursor position. Alternatively, another pointing device which designates input coordinates on a screen, such as a mouse, a trackpad, a trackball or the like, may be used instead of the controller 7, and based on an output value output from the mouse or the like, the position on the screen of a cursor may be calculated.

While certain exemplary embodiments have been described in detail, the foregoing description is in all aspects illustrative and not restrictive. It is understood that numerous other modifications and variations can be devised without departing from the scope of the invention.

What is claimed is:

1. A non-transitory recording medium recording a game program which is executed by a computer in a game apparatus to which a display device and an operation device are connected, wherein a game image in which a topographic object and a movable object are provided in a virtual game space is displayed on a screen of the display device, the game program comprising:
    detecting a designated position of the topographic object designated by the operation device;
    changing a shape of topography at the detected designated position of the topographic object and in a vicinity thereof;
    controlling movement of the movable object based on the changed shape; and
    restoring the shape of the deformed topographic object into a shape before the deformation, wherein the restoring is done during game play.

2. The recording medium according to claim 1, further including determining a height of the designated position to be a predetermined height such that the height of the designated position is gradually changed depending on a distance from the designated position, and changing a surrounding shape into a shape whose vertical difference from a surface of the topographic object before deformation gradually decreases with an increase in a distance from the designated position.

3. The recording medium according to claim 1, wherein the game program further comprises:
   obtaining first operation data or second operation data from the operation device,
   the heights of the topographic object are changed at the designated position and in the vicinity thereof toward a first direction when the first operation data is obtained, and the heights of the topographic object are changed at the designated position and in the vicinity thereof toward a second direction different from the first direction when the second operation data is obtained.

4. The recording medium according to claim 1, wherein the topographic object is composed of a plurality of polygons, and
   changing the shape includes:
      calculating a distance between the designated position of the topographic object and vertices of the plurality of polygons;
      calculating a change amount of a height of each of the vertices of the plurality of polygons; and
      changing a position of each of the vertices of the plurality of polygons based on the change amount.

5. The recording medium according to claim 4, wherein a change amount of a height of each of the vertices of the plurality of polygons is calculated so that the height approaches heights of vertices around the vertex.

6. The recording medium according to claim 4, further comprising:
   calculating a movement amount of the movable object by performing a physical calculation with respect to a contact surface based on the calculated change amount when the movable object contacts the topographic object; and
   moving the movable object based on the movement amount.

7. The recording medium according to claim 4, wherein the game program further comprises:
   calculating normal vectors of the plurality of changed polygons; and
   calculating a gravity vector pointing immediately downward in the virtual game space,
   wherein controlling the movable object includes performing a physical calculation based on the normal vector and the gravity vector, thereby setting a movement direction of the movable object.

8. The recording medium according to claim 6, wherein specific process information is set for a portion of the plurality of polygons, and
   the game program further comprises:
      determining whether or not the specific process information is set for a polygon which the movable object contacts;
      correcting at least one of the calculated movement amount and the calculated movement direction when it is determined that the specific process information is set; and
      moving the movable object based on the at least one of the movement amount and the corrected movement direction.

9. The recording medium according to claim 1, wherein the game executed by the game program is a ball game in which the movable object is a ball,
   the ball is moved toward a target enclosed by a target frame, and a point is gained by putting the ball into the target frame, and
   an operation of moving the ball toward the target frame is an operation of causing an object to be operated to perform shooting.

10. A game system comprising:
   a display device for displaying a game image in which a topographic object and a movable object are provided in a virtual game space;
   an operation device;
   a processor;
   a memory coupled to said processor, said memory storing instructions that, when executed by said processor, control said processor to:
   detect a designated position of the topographic object designated by the operation device;
   change a shape of topography at the detected designated position of the topographic object and in a vicinity thereof, into a shape whose height is gradually changed, depending on a distance from the designated position;
   based on the changed shape, control movement of the movable object; and
   restore the shape of the deformed topographic object into a shape before the deformation, wherein the restoring is done during game play.

11. A game apparatus to which a display device and an operation device are connected, wherein a game image in which a topographic object and a movable object are provided in a virtual game space is displayed on a screen of the display device, the game apparatus comprising:
   a processor;
   a memory coupled to said processor, said memory storing instructions that, when executed by said processor, control said processor to:
   detect a designated position of the topographic object designated by the operation device;
   change a shape of topography at the detected designated position of the topographic object and in a vicinity thereof, into a shape whose height is gradually changed, depending on a distance from the designated position;
   based on the changed shape, control movement of the movable object; and
   restore the shape of the deformed topographic object into a shape before the deformation, wherein the restoring is done during game play.

12. A method of operating a game apparatus to which a display device and an operation device are connected, wherein a game image in which a topographic object and a movable object are provided in a virtual game space is displayed on a screen of the display device, the method comprising:
   detecting a designated position of the topographic object designated by the operation device;
   changing a shape of topography at the detected designated position of the topographic object and in a vicinity thereof;
   controlling movement of the movable object based on the changed shape changed; and
   restoring the shape of the deformed topographic object into a shape before the deformation, wherein the restoring is done during game play.

* * * * *